(12) United States Patent
Cartwright et al.

(10) Patent No.: US 9,233,321 B2
(45) Date of Patent: Jan. 12, 2016

(54) QUICK CHANGE FILTER CLOTH

(71) Applicant: FLSmidth A/S, Valby (DK)

(72) Inventors: Sam Cartwright, Salt Lake City, UT (US); Reuben Neumann, West Jordan, UT (US)

(73) Assignee: FLSMIDTH A/S (DK)

( * ) Notice: Subject to any disclaimer, the term of this patent is extended or adjusted under 35 U.S.C. 154(b) by 0 days.

(21) Appl. No.: 14/398,159

(22) PCT Filed: May 23, 2013

(86) PCT No.: PCT/US2013/042331
§ 371 (c)(1),
(2) Date: Oct. 31, 2014

(87) PCT Pub. No.: WO2013/173847
PCT Pub. Date: Nov. 21, 2013

(65) Prior Publication Data
US 2015/0083654 A1  Mar. 26, 2015

Related U.S. Application Data

(60) Provisional application No. 61/647,575, filed on May 16, 2012.

(51) Int. Cl.
*B01D 25/164* (2006.01)
*B01D 25/176* (2006.01)

(52) U.S. Cl.
CPC ............ *B01D 25/164* (2013.01); *B01D 25/176* (2013.01)

(58) Field of Classification Search
None
See application file for complete search history.

(56) References Cited

U.S. PATENT DOCUMENTS 4,053,416 A  10/1977 Howard et al.
4,491,519 A * 1/1985 Kurita ............................ 210/225
(Continued)

FOREIGN PATENT DOCUMENTS

DE  20317546 U1  4/2004
EP  0738527 A2  10/1996
(Continued)

OTHER PUBLICATIONS

International Search Report and written opinion dated Nov. 7, 2013, 7 pages.
(Continued)

*Primary Examiner* — Benjamin Kurtz
(74) *Attorney, Agent, or Firm* — Jeffrey A. Sharp; Aaron M. Pile; Daniel DeJoseph (57) ABSTRACT

A filter plate assembly [1] comprises a filter plate [100] having a recess [102], a radially-inwardly extending shelf portion [108] having a seat surface [101], and a feed eye aperture [110] extending through the shelf portion. An adapter ring [170] is placed within said recess [102]. The adapter ring [170] has a flange [172] and a barrel [179] extending from the flange [172]. The barrel [179] has an inner wall [180] and an outer wall [182], and is positioned within said aperture [110] such that the outer wall [182] of the barrel [179] is in close proximity with said aperture [110]. The flange [172] comprises an inner surface [173] which abuts the seat surface [101]. The filter plate assembly [1] further comprises a filter cloth assembly [160] comprising a filter cloth [168] having an aperture [168B], and a grommet [168A] fitted within the filter cloth aperture [168B]. The grommet [168A] is configured to align with the adapter ring [170], and comprises a collar [167] having an inner surface [167A] which is bonded or mechanically attached to a first side [188] of the filter cloth [168]. A second side [189] of the filter cloth [168] abuts a sealing surface [185] of the adapter ring [170].

17 Claims, 7 Drawing Sheets

(56) References Cited

U.S. PATENT DOCUMENTS

| | | |
|---|---|---|
| 7,635,132 B2 | 12/2009 | Hibble |
| 2004/0112818 A1* | 6/2004 | Hibble .................... 210/230 |
| 2008/0017592 A1* | 1/2008 | Maurer et al. ............ 210/767 |
| 2010/0200518 A1 | 8/2010 | Ribet et al. |

FOREIGN PATENT DOCUMENTS

| | | |
|---|---|---|
| GB | 2107599 A | 5/1983 |
| GB | 2182861 A | 5/1987 |
| WO | 9206760 A1 | 4/1992 |

OTHER PUBLICATIONS

The European Search Report and Opinion dated Nov. 6, 2015, 4 pages.

* cited by examiner

QUICK CHANGE FILTER CLOTH

BACKGROUND OF THE INVENTION

This invention relates to filtration processes and equipment, and more particularly to filter presses, such as those used in slurry dewatering processes during minerals processing.

Filter presses generally comprise a horizontally-arranged stack of vertically extending filter plates which are separated by a small space when the filter press stack is fully opened for cake discharge. Each filter plate comprises respective filter cloths on its opposing sides. In order to facilitate installation or removal of the filter cloths, it is necessary to lift the very heavy and sizeable filter plate assemblies and in some instances, completely extract them from the horizontally-arranged stack to gain access to the securing mechanisms which join the filter cloth to the filter plate. An example of such a filter plate assembly is shown in U.S. Pat. No. 5,851,387, which is incorporated herein by reference.

Figure 1:
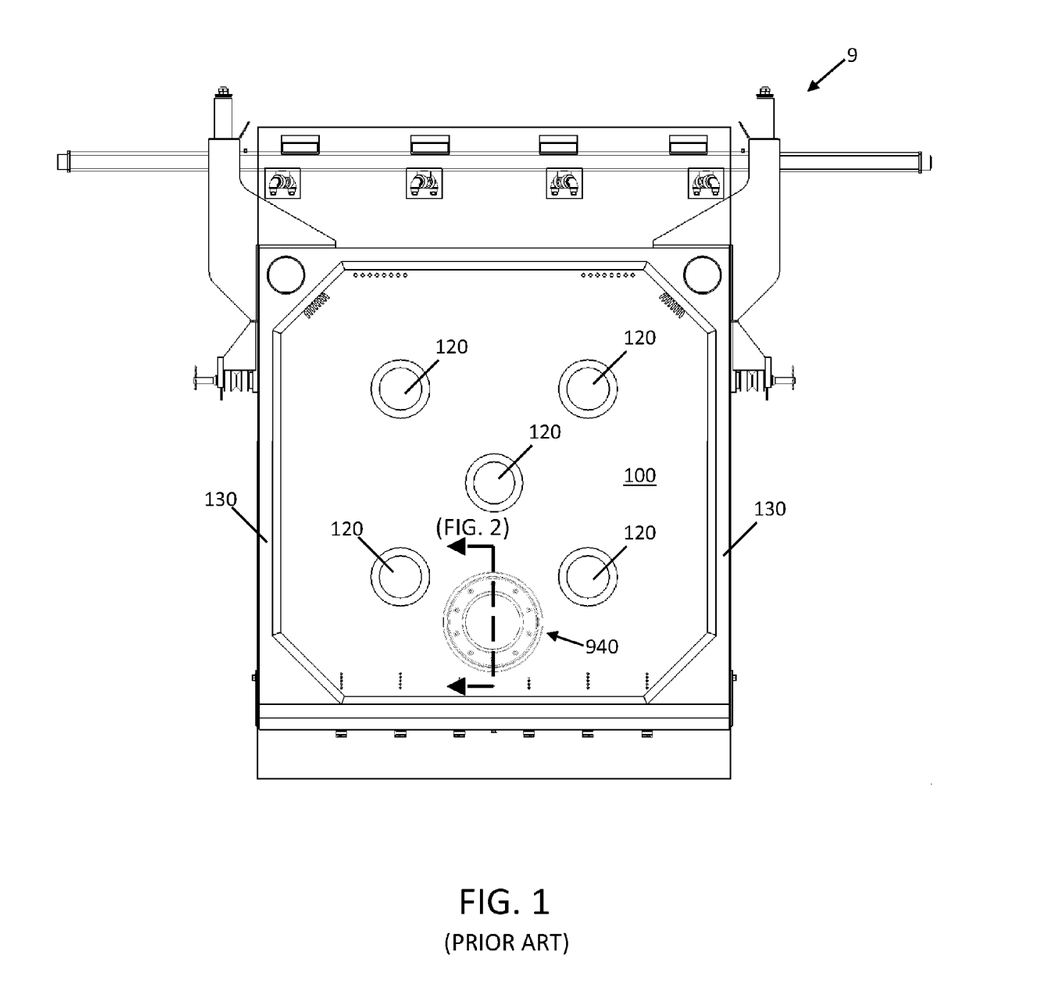
FIG. 1 is front plan view of a conventional filter plate.
Figure 2:
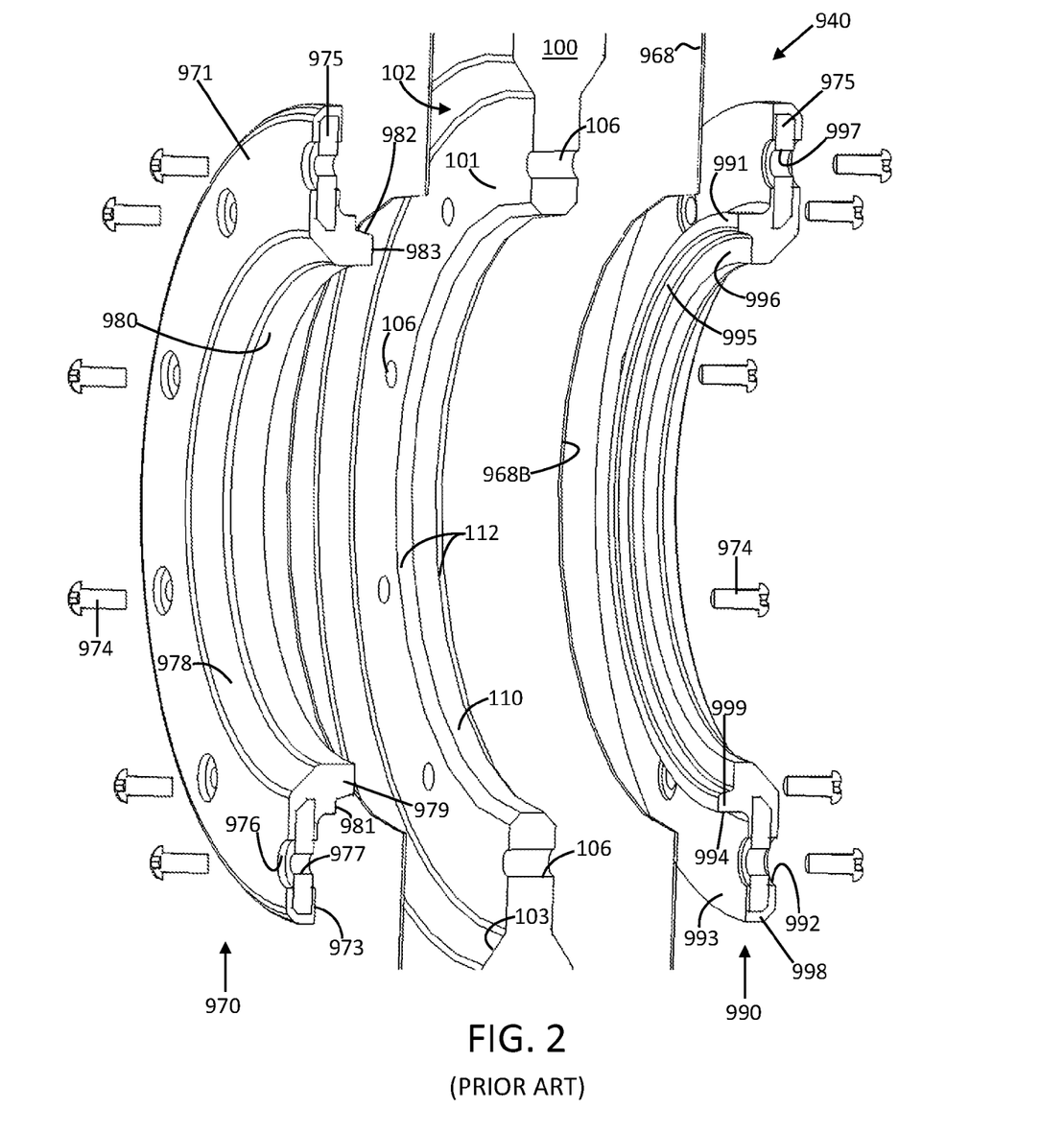
FIG. 2 is a partial isometric cross-sectional view of the conventional filter plate assembly shown in FIG. 1.

FIGS. 1 and 2 illustrate respective front plan and isometric cross-sectional views of one example of a conventional filter plate assembly 9, and conventional feed eye assembly 940, which require complete extraction from a filter press during filter cloth 968 replacement. Conventional filter plate assembly 9 comprises a first filter plate 100 defined by a base portion 104 having standoffs 120, peripheral walls 130, and a shelf portion 108. The shelf portion 108 is generally composed of a seat surface 101, a recess 102, a tapered surface 103, and a feed eye aperture 110. Chamfers 112 surround the feed eye aperture 110, and a plurality of bores 106 are provided within the shelf portion 108.

The conventional filter plate assembly 9 further comprises a conventional feed eye assembly 940. The conventional feed eye assembly 940 comprises, on one side, a filter cloth 968 having an aperture 968B therein, and a separate retaining ring 990 having a radial projection 998 and a ring protrusion 999 extending therefrom, which is configured to be received within the aperture 968B of filter cloth 968. Retaining ring 990 comprises a ring protrusion end 991, a ring protrusion outer wall 994, a ring protrusion inner wall 995, a shelf 996, an inner surface 993, and one or more head clearance holes 992. A backer plate ring 975 having one or more shaft clearance holes 997 may be positioned within the retaining ring 990.

The conventional feed eye assembly 940 comprises, on an opposite side, a holding ring 970 comprising a radial projection 971 and a barrel 979, extending therefrom, which is configured to be received within the aperture 968B of a filter cloth 968. The holding ring 970 further comprises an inner surface 973, a shelf 981, one or more head clearance holes 976, a chamfer surface 978, a barrel inner wall 980, a barrel outer wall 982, and a barrel end 983. A backer plate ring 975 having one or more shaft clearance holes 977 may be positioned within the holding ring 970.

The ring protrusion 999 of the retaining ring 990 and the barrel 979 of the holding ring 970 pass through the apertures 968B of respective filter cloths 968 such that the inner surfaces 973, 993 of the radial projections 971, 998 abut an annular surface of the filter cloth 968 and such that the barrel outer wall 982 and ring protrusion outer wall 994 are surrounded by filter cloth apertures 968B. When assembled, the barrel end 983 rests against the shelf 996, the barrel outer wall 982 engages ring protrusion inner wall 995, and ring protrusion end 991 rests against shelf 981.

One or more fasteners 974 pass through head clearance holes 976, 992 and shaft clearance holes 977, 997 of the holding ring 970 and retaining ring 990, respectively, and engage the bores 106 in the first filter plate 100. When fasteners 974 are tightened, the filter cloths 968 are secured to the filter plate 100 by virtue of the retaining properties of radial projections 971, 998. Because a large amount of space is needed to gain access to and remove fasteners 974, it is very difficult or nearly impossible to change filter cloths 968 on such assemblies 9, even when the filter plates 100 are separated by their maximum distance. Moreover, the use of two different geometries for retaining ring 990 and holding ring 970 increases manufacturing and inventory costs.

OBJECTS OF THE INVENTION

It is, therefore, an object of the invention to provide a filter cloth that can be easily be replaced without removing filter plates from the filter press plate stack.

It is yet another object of the invention to provide a competitive solution for quick filter cloth changes, while still providing all of the widely accepted benefits and advantages associated with lower feed port feeding processes.

Moreover, it is an object of the invention to provide a retrofittable solution for quick filter cloth changes at the preference of the customer, at any time, on an aftermarket basis.

These and many other objects of the invention will be apparent from the drawings and description herein. Although every object of the invention is believed to be attained by at least one embodiment of the invention, there is not necessarily any one embodiment of the invention that achieves all of the objects of the invention.

SUMMARY OF THE INVENTION

A filter plate assembly may comprise a filter plate having a recess, a radially-inwardly extending shelf portion having a seat surface, and a feed eye aperture extending through the shelf portion. An adapter ring may be placed within said recess and may comprise a tapered surface which is complimentary in shape with a tapered surface forming said recess. The adapter ring may have a flange and a barrel extending from the flange. The barrel may have an inner wall and an outer wall, and may be positioned within said aperture such that the outer wall of the barrel is in close proximity with said aperture, for example, by interference fit, press fit, a snug fit, a zero tolerance fit, a snap or other connection, a taper lock fit, or a loose fit.

The flange may comprise an inner surface which abuts the seat surface. The filter plate assembly may further comprise a filter cloth assembly composed of a filter cloth having an aperture, and a grommet fitted within the filter cloth aperture. The grommet may be configured to align with the adapter ring, and may comprise a collar having an inner surface which can be bonded or mechanically attached to a first side of the filter cloth. The sealing surface of the collar may comprise at least one annular rib or groove defining a serpentine profile, and the adapter ring may comprise a backer plate ring for rigidity and support. A ring may extend from the collar, the ring being positioned within said barrel such that an outer wall of the ring is in close proximity with an inner wall of the barrel. A second side of the filter cloth may abut a sealing surface of the adapter ring. In some embodiments, a clearance hole may be provided to the flange, and the shelf portion of the filter plate may comprise a bore. At least one fastener may pass through the clearance hole and into the bore, in order to secure the adapter ring to the filter plate. The bore may be a threaded bore, and the at least one fastener may be an externally-threaded fastener which threadedly engages said bore.

In some instances, the bore may be a clearance bore, and the at least one fastener may be an internally-threaded, smooth shank barrel bolt fastener which slidingly fits within the bore and is configured to receive an externally threaded fastener. In other embodiments, the bore may be a clearance bore, and the at least one fastener may be an externally-threaded fastener which fits within an internally-threaded fastener.

The grommet may comprise a plurality of bosses, each having an abutment surface. Each boss may have tapered sidewalls with valleys being interposed between the bosses in alternating arrangement. At least one of the valleys may be oriented towards a bottommost portion of the feed eye assembly, such that it extends towards a bottom portion of the filter plate. An external portion of the grommet may comprise an external seal surface, and an internal portion of the adapter ring may comprise a complimentary internal seal surface. Two adapter rings and two filter cloth assemblies may be provided on opposing sides of the filter plate. A durometer of the adapter ring may be lower than the durometer of the grommet.

A filter cloth assembly is also disclosed. The assembly may comprise a filter cloth having a first side, a second side, and an aperture extending therethrough. The filter cloth assembly may further comprise a grommet fitted within the filter cloth aperture, and the grommet may have a collar and a ring extending from the collar. The ring may protrude through the aperture and may be configured for positioning within a barrel of an adapter ring or a feed eye aperture. The collar may comprise an inner surface which may be bonded or mechanically attached to the first side of the filter cloth such that the second side of the filter cloth abuts a sealing surface. The grommet may further comprise a number of bosses, each having an abutment surface.

A universal filter cloth system is also disclosed. The system may comprise a filter cloth assembly composed of a filter cloth and grommet. The filter cloth may have a first side, a second side, and an aperture extending therethrough. The grommet may be fitted within the filter cloth aperture. The grommet may comprise a collar and a ring extending from the collar. The ring may be configured for positioning within a barrel of an adapter ring or a feed eye aperture. The collar may comprise an inner surface which is bonded to the first side of the filter cloth. The grommet may also comprise a number of bosses, each boss having an abutment surface. The filter cloth assembly may be used with a first filter plate assembly comprising a first filter plate having an adapter ring positioned adjacent a feed eye aperture. The same filter cloth assembly may also be used with a second filter plate assembly comprising a second filter plate and a feed eye aperture, wherein the second filter plate has a different geometry than the first filter plate. The grommet of the filter cloth assembly may be configured to be fitted into the adapter ring of the first filter plate assembly. The grommet of the filter cloth assembly may also be configured to be fitted into the feed eye aperture of the second filter plate assembly.

The adapter ring may comprise a sealing surface thereon, and the second filter plate may also comprise a sealing surface thereon. The second side of the filter cloth may be configured to abut either sealing surface to prevent slurry from passing between the grommet and feed eye aperture. In some embodiments, the sealing surfaces may comprise at least one of an annular rib, a groove, or an o-ring which defines a serpentine profile.

DETAILED DESCRIPTION OF THE INVENTION

Figure 3:
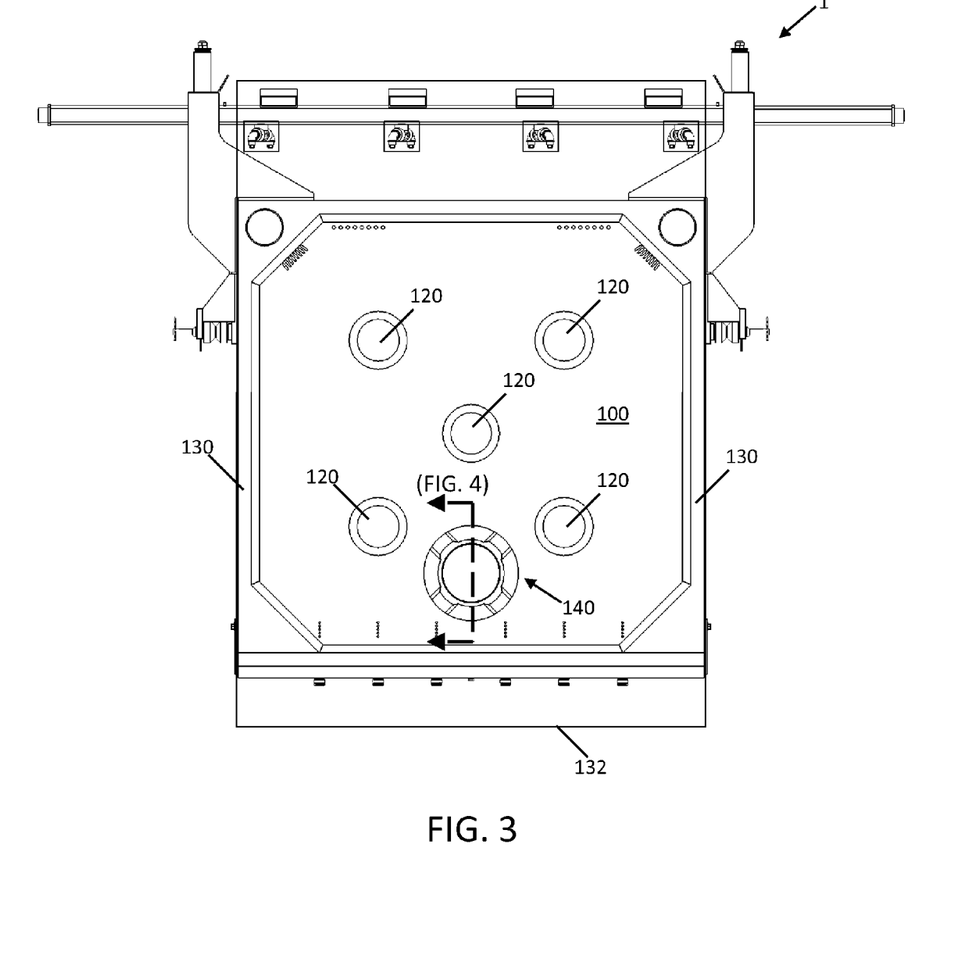
FIG. 3 is a front plan view of a first filter plate assembly according to some embodiments of the invention.

As shown in FIG. 3, a first filter plate assembly 1 is provided. First filter plate assembly 1 comprises a first filter plate 100 defined by a base portion 104 having standoffs 120, peripheral walls 130, and a shelf portion 108. The shelf portion 108 is generally composed of a seat surface 101, a recess 102, a tapered surface 103, and a feed eye aperture 110. Chamfers 112 surround the feed eye aperture 110, and a plurality of bores 106 are provided within the shelf portion 108.

The first filter plate assembly 1 further comprises a first feed eye assembly 140. The first feed eye assembly 140 comprises at least one filter cloth assembly 160. The filter cloth assembly 160 further comprises a filter cloth 168 having a first side 188, a second side 189, and an aperture 168B which extends from the first side 188 to the second side 189. The filter cloth assembly 160 further comprises a separate grommet 168A provided within the aperture 168B. The grommet 168A comprises a longitudinally-extending ring 164 having a ring inner wall 163 and a ring outer wall 166. The grommet 168A further comprises a radially-extending collar 167 having an undersurface 167A configured for securing to the filter cloth 168. The first side 188 of the filter cloth 168 may be bonded to the undersurface 167A of the collar 167 using chemical means, ultrasonic welding, staples, tacks, adhesives, friction welding, stitching, embedding, or other mechanical fastening means.

A plurality of bosses 165 are also provided on the grommet 168A. Each boss 165 comprises at least one sidewall 169, and an abutment surface 165A which is configured to contact an abutment surface 165A of an adjacent boss 165 provided on an adjacent filter plate assembly 1. One or more valleys 161 are formed between the sidewalls 169 and extend between the bosses 165. The valleys 161 provide a channel for egress of slurry from within the feed eye assembly 140 to the filter chamber area defined between standoffs 120 and peripheral wall 130, where cake formation occurs. Sidewalls 169 are preferably tapered by an acute angle 192 (measured from a theoretical longitudinal feed eye axis 190) in order to reduce slurry buildup and/or clogging in valleys 161. At least one of the valleys 161 may preferably be oriented towards a bottom portion 132 of the feed eye assembly 140, such that it extends downwardly with respect to the first filter plate 100. An external seal surface 162 may be provided to the grommet 168A, which spans between the collar 167 and the ring 164. An oblique internal surface 163A may also be provided to the grommet 168A, in order to improve slurry flow between filter plate assemblies 1 and help residual slurry fall away from the ring inner wall 163.

Figure 4:
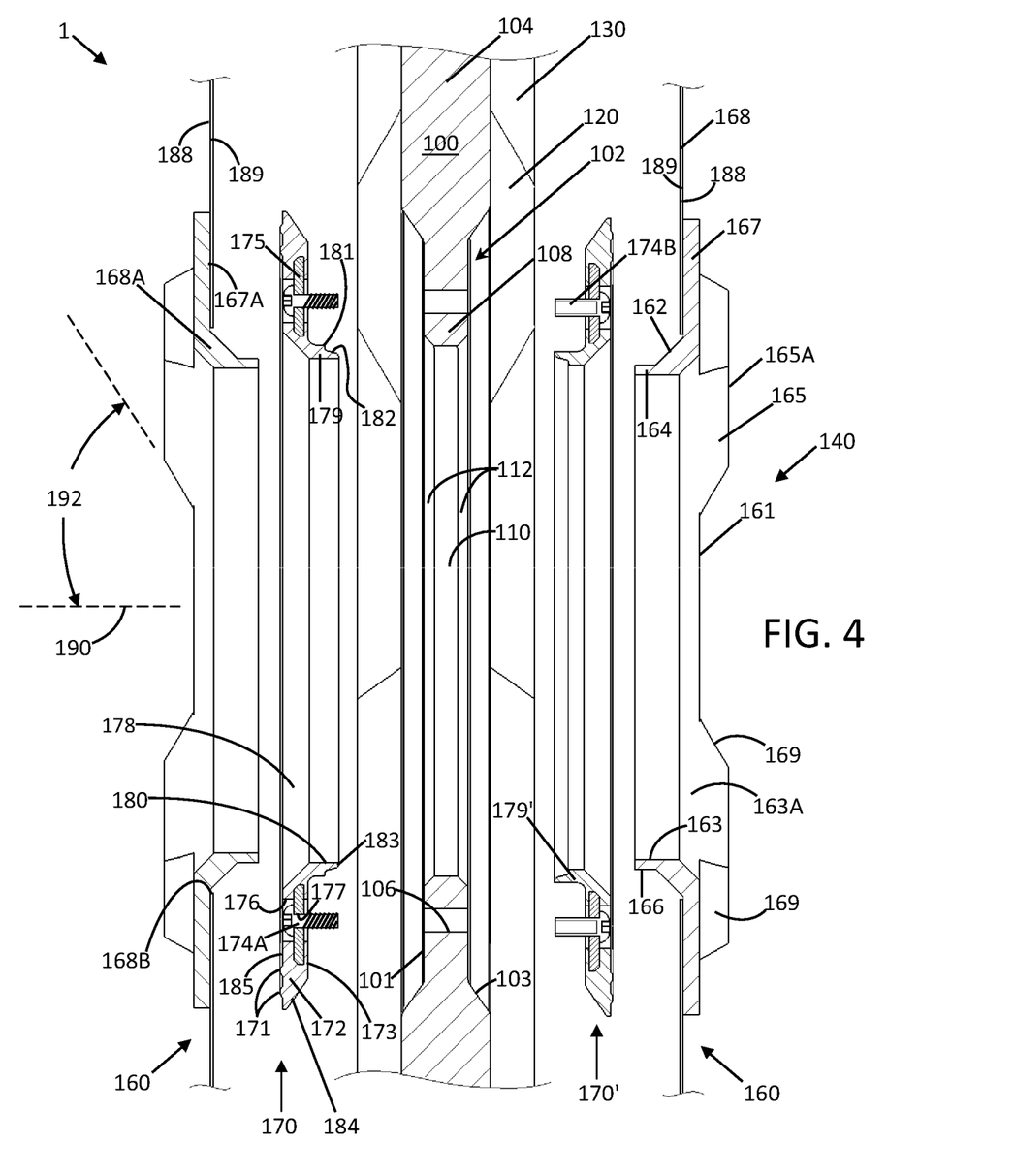
FIG. 4 is a partial cross-sectional view of the filter plate assembly shown in FIG. 3.
Figure 5:
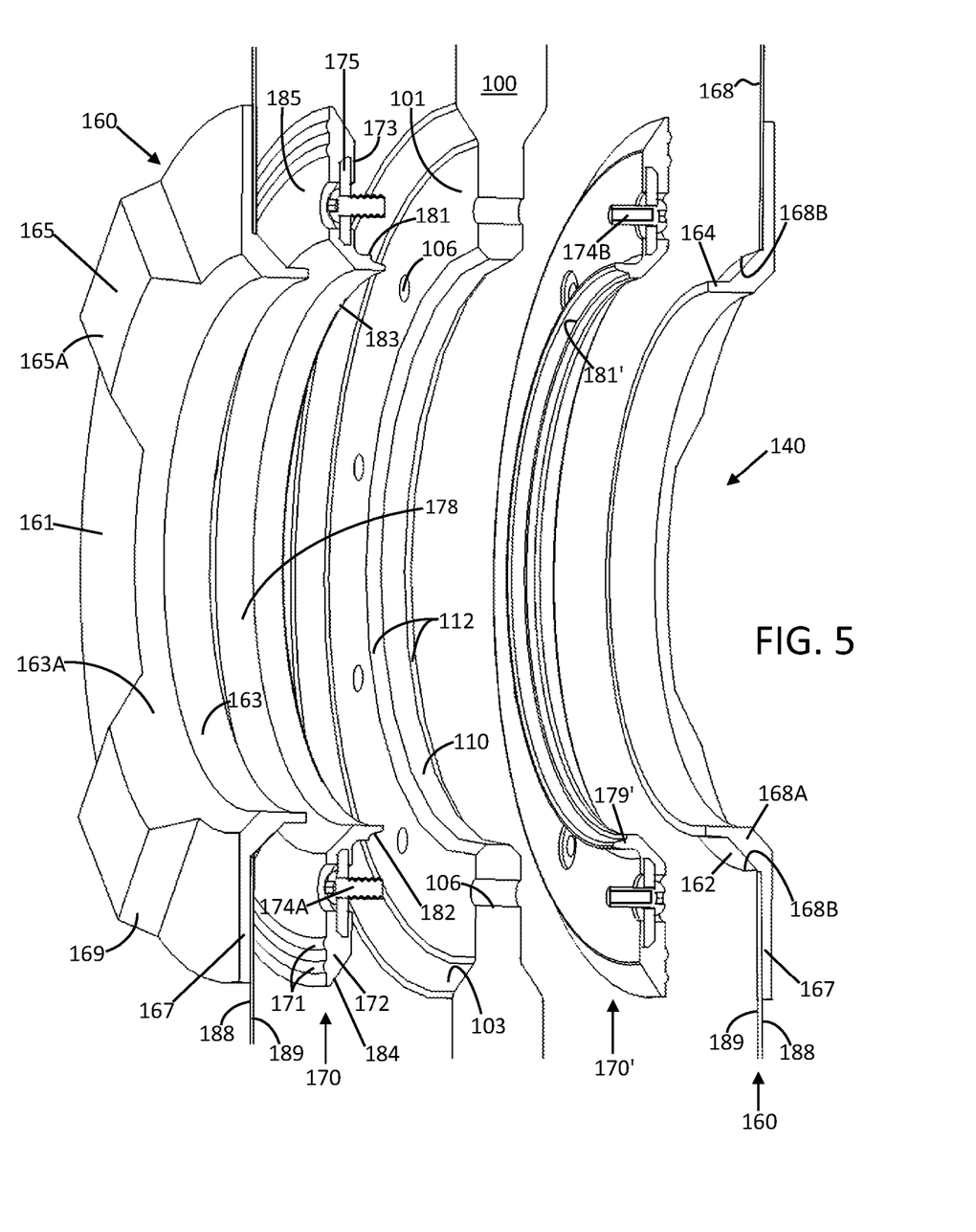
FIG. 5 is an isometric view of FIG. 5.

The first filter plate assembly 1 further comprises a first adapter ring 170 having a radially-extending flange 172 and an axially-extending barrel 179 formed between a barrel inner wall 180, a barrel outer wall 182, and a barrel end 183. The barrel 179 may comprise one or more sealing features such as a lip 181. A second adapter ring 170' may be used in combination with the first adapter ring 170 to sandwich the first filter plate 100 as shown in FIGS. 4 and 5. In some embodiments, the adapter rings 170, 170' may have similar or identical geometries. As shown, the barrel 179 of the first adapter ring 170 may be configured with one or more sealing features 181 which interlockingly engage complimentary sealing features 181' provided on the barrel 179' of the second adapter ring 170', thereby forming a leak-resistant serpentine path therebetween.

The flange 172 may comprise a tapered surface 184 which is designed to prevent slurry from passing between the first adapter ring 170 and the first filter plate 100. The flange 172 may also be configured with an inner surface 173 for abutting the seat surface 101 of the filter plate's shelf portion 108. Flange 172 may further be provided with an outer sealing surface 185 comprising one or more annular ribs or grooves 171. A backer plate ring 175 may be provided within portions of the adapter rings 170, 170' for example within the flange 172, in order to stiffen and strengthen the overall structure of the adapter rings 170, 170'. In the shown embodiment, flange 172 comprises a shaft clearance hole 177 through the backer plate ring 175, and head clearance hole 176 suitable for either an externally-threaded fastener 174A or an internally-threaded barrel bolt fastener 174B to pass through. Adapter rings 170, 170' provided on opposing sides of a first filter plate 100 are joined to the first filter plate 100 by first placing one or more externally-threaded fasteners 174A and one or more internally-threaded barrel bolt fasteners 174B through bores 106 in the shelf portion 108, and then threadedly connecting them. The fasteners 174A, 174B are then tightened to clamp the adapter rings 170, 170' to the first filter plate 100. In some embodiments, the adapter rings 170, 170' may comprise an internal seal surface 178 which is tapered and complimentary to the external seal surface 162 of grommet 168A.

Prior to use, first filter plate 100 and adapter rings 170, 170' are secured together in the manner previously mentioned. The barrel 179 of each adapter ring 170, 170' is received in the feed eye aperture 110, and the flange 172 of each adapter ring 170, 170' is received in the recess 102 of the first filter plate 100. Fasteners 174A, 174B secure the adapter rings 170 to the first filter plate 100. In the particular embodiment shown in FIGS. 4 and 5, a first adapter ring 170 on one side of the filter plate comprises an externally-threaded fastener 174A and a second adapter ring 170' on the opposite side of the filter plate comprises an internally-threaded barrel bolt fastener 174B which threadedly accepts the externally-threaded fastener 174A. Both fasteners 174A, 174B extend through bore 106. While not shown, it is anticipated that the bore 106 may be a threaded bore, and both fasteners 174A, 174B may instead be shortened externally-threaded fasteners which threadedly engage said internally-threaded bore 106 from opposing sides.

Filter cloth assembly 160 can be installed with the first filter plate assembly 1 by first spreading the stack of first filter plates 100 in the filter press, dropping the filter cloth assembly 160 between the stack of first filter plates 100, and then pressing the ring 164 of the grommet 168A into the inner wall 180 of the barrel 179 by hand or with an elongated tool. Removal of filter cloth assembly 160 is done in an opposite manner by first spreading the stack of first filter plates 100 in the filter press and then pulling the ring 164 of the grommet 168A out of the respective adapter ring 170, 170'.

Figure 6:
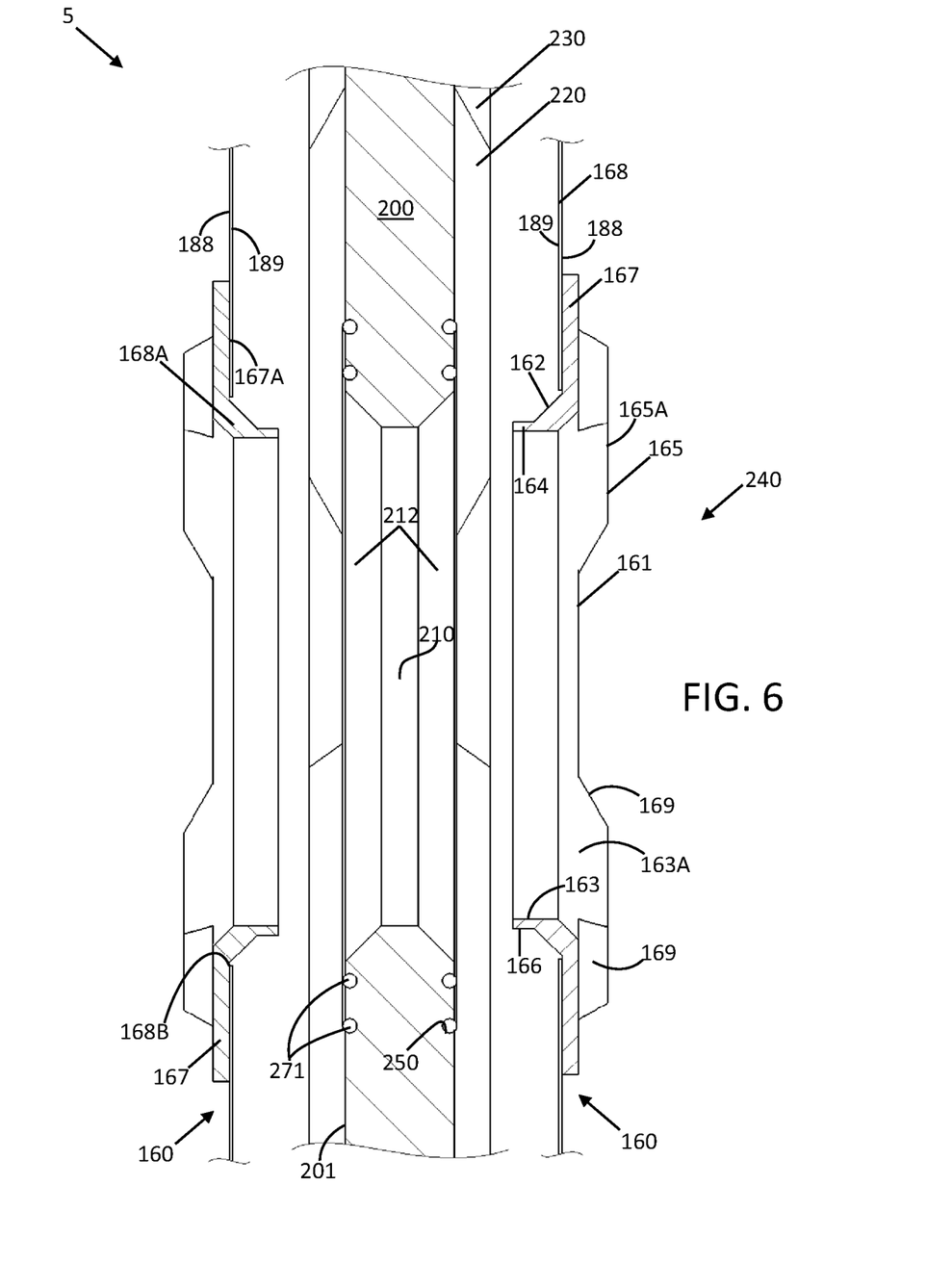
FIG. 6 is a partial cross-sectional view of a second filter plate assembly according to yet other embodiments.
Figure 7:
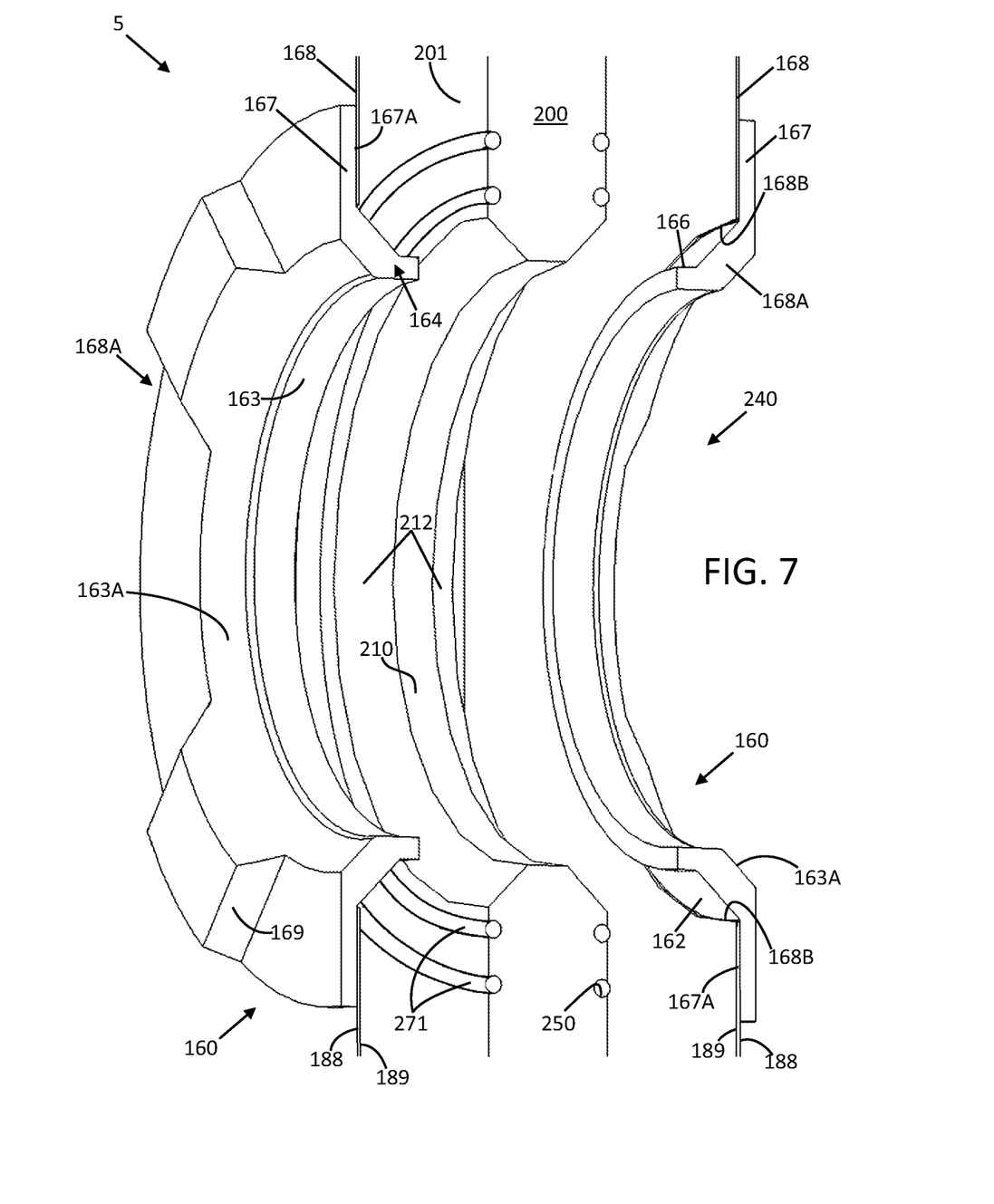
FIG. 7 is an isometric view of FIG. 6.

Filter cloth assembly 160 can also be installed into a second filter plate assembly 5 having different geometries than the first filter plate assembly 1, by first spreading the stack of second filter plates 200 in the filter press and then pressing the ring 164 of the grommet 168A directly into the feed eye aperture 210 of a second feed eye assembly 240 provided in one of the second filter plates 200, without the need for adapter plates 170, 170'. The external seal surface 162 on the grommet 168A may sit flush in sealing arrangement with one or more chamfers 212 surrounding the feed eye aperture 210. The second filter plate assembly 5 shown in FIGS. 6 and 7 is similar to the first filter plate assembly 1 in that the second filter plate assembly 5 similarly comprises a seat surface 201, one or more standoffs 220, and a peripheral wall 230. However, the second filter plate assembly 5 differs from the first filter plate assembly 1 by further comprising one or more grooves 250 within the seat surface 201, wherein each groove 250 holds an o-ring 271 or equivalent seal or packing means. The o-ring(s) 271 prevent slurry and filtrate from moving between the second filter plate 200, the grommet 168A, and the filter cloth 168, thereby reducing potential wear. Removal of filter cloth assembly 160 is done in an opposite manner by first spreading the stack of second filter plates 200 in the filter press and then pulling the ring 164 of the grommet 168A from the feed eye aperture 210 and breaking all seals between chamfers 212 and external seal surface 162.

A contractor or other entity may provide a filter plate assembly, or operate a filter plate assembly configured with a filter cloth assembly in whole, or in part, as shown and described. For instance, the contractor may receive a bid request for a project related to designing or operating a filter plate or filter cloth apparatus, or the contractor may offer to design such a system or a process for a client. The contractor may then provide, for example, any one or more of the devices or features thereof shown and/or described in the embodiments discussed above. The contractor may provide such devices by selling those devices or by offering to sell those devices. The contractor may provide various embodiments that are sized, shaped, and/or otherwise configured to meet the design criteria of a particular client or customer. The contractor may subcontract the fabrication, delivery, sale, or installation of a component of the devices disclosed, or of other devices used to provide said devices. The contractor may also survey a site and design or designate one or more storage areas for stacking the material used to manufacture the devices, or for storing the devices and/or components thereof. The contractor may also maintain, modify, or upgrade the provided devices. The contractor may provide such maintenance or modifications by subcontracting such services or by directly providing those services or components needed for said maintenance or modifications, and in some cases, the contractor may modify preexisting filter presses, filter plates, filter cloth apparatus, assemblies, or parts thereof with a "retrofit kit" to arrive at a modified device comprising one or more method steps, devices, components, or features of the systems and processes discussed herein.

Although the invention has been described in terms of particular embodiments and applications, one of ordinary skill in the art, in light of this teaching, can generate additional embodiments and modifications without departing from the spirit of or exceeding the scope of the claimed.

For instance, while not shown, rings 164 may be omitted from grommets 168A in certain instances, such as to facilitate the installation and removal of filter cloth assemblies. Moreover, while not shown, in some embodiments, filter cloth 168 may be overmolded within collar 167 or otherwise captured within a peripheral circumferential groove provided within collar 167. Additionally, instead of o-rings 271 provided within grooves 250, one or more annular projections may be provided which integrally and monolithically extend from the second filter plate 200, and which are composed of the same material as the second filter plate 200.

Accordingly, it is to be understood that the drawings and descriptions herein are proffered by way of example to facilitate comprehension of the invention and should not be construed to limit the scope thereof.

| Reference numeral identifiers | |
|---|---|
| 1 | First filter plate assembly |
| 5 | Second filter plate assembly |
| 9 | Conventional filter plate assembly |
| 100 | First filter plate |
| 101 | Seat surface |
| 102 | Recess |
| 103 | Tapered surface |
| 104 | Base portion |
| 106 | Bore |
| 108 | Shelf portion |
| 110 | Feed eye aperture |
| 112 | Chamfer |
| 120 | Standoff |
| 130 | Peripheral wall |
| 132 | Bottom portion |
| 140 | First feed eye assembly |
| 160 | Filter cloth assembly |
| 161 | Valley |
| 162 | External seal surface |
| 163 | Ring inner wall |
| 163A | Oblique internal surface |
| 164 | Ring |
| 165 | Boss |
| 165A | Abutment surface |
| 166 | Ring outer wall |
| 167 | Collar |
| 167A | Undersurface |
| 168 | Filter cloth |
| 168A | Grommet |
| 168B | Aperture |
| 169 | Sidewall |
| 170 | Adapter ring |
| 170' | Adapter ring |
| 171 | Annular rib or groove |
| 172 | Flange |
| 173 | Inner surface |
| 174A | Externally-threaded fastener |
| 174B | Internally-threaded barrel bolt fastener |
| 175 | Backer plate ring |
| 176 | Head clearance hole |
| 177 | Shaft clearance hole |
| 178 | Internal seal surface |
| 179 | Barrel |
| 179' | Barrel |
| 180 | Barrel inner wall |
| 181 | Outer interlocking feature (e.g., sealing lip) |
| 181' | Inner interlocking feature (e.g., sealing lip) |
| 182 | Barrel outer wall |
| 183 | Barrel end |
| 184 | Tapered surface |
| 185 | Sealing surface |
| 188 | First side of filter cloth |
| 189 | Second side of filter cloth |
| 190 | Longitudinal feed eye axis |
| 192 | Acute angle |
| 200 | Second filter plate |
| 201 | Seat surface |
| 210 | Feed eye aperture |
| 212 | Chamfer |
| 220 | Standoff |
| 230 | Peripheral wall |
| 240 | Second feed eye assembly |
| 250 | Groove |
| 271 | O-ring |
| 940 | Conventional feed eye assembly |
| 968 | Filter cloth |
| 968B | Aperture |
| 970 | Holding ring |
| 971 | Radial projection |
| 973 | Inner surface |
| 974 | Fastener |
| 975 | Backer plate ring |
| 976 | Head clearance hole |
| 977 | Shaft clearance hole |
| 978 | Chamfer surface |
| 979 | Barrel |
| 980 | Barrel inner wall |
| 981 | Shelf |
| 982 | Barrel outer wall |
| 983 | Barrel end |
| 990 | Retaining ring |
| 991 | Ring protrusion end |
| 992 | Head clearance hole |
| 993 | Inner surface |
| 994 | Ring protrusion outer wall |
| 995 | Ring protrusion inner wall |
| 996 | Shelf |
| 997 | Shaft clearance hole |
| 998 | Radial projection |
| 999 | Ring protrusion |

What is claimed is:

1. A filter plate assembly [1] comprising:
    a filter plate [100] having a recess [102], a radially-inwardly extending shelf portion [108] having a seat surface [101], and a feed eye aperture [110] extending through the shelf portion;
    an adapter ring [170] placed within said recess [102] and having a flange [172] and a barrel [179] extending from the flange [172], the barrel [179] having an inner wall [180] and an outer wall [182] and being positioned within said aperture [110] such that the outer wall [182] of the barrel [179] is in close proximity with said aperture [110], wherein the flange [172] comprises an inner surface [173] which abuts the seat surface [101]; and
    a filter cloth assembly [160] comprising a filter cloth [168] having an aperture [168B] extending therethrough, and a grommet [168A] fitted within the filter cloth aperture [168B] and configured to align with the adapter ring [170], the grommet [168A] comprising a collar [167], having an inner surface [167A] which is bonded or mechanically attached to a first side [188] of the filter cloth [168] such that a second side [189] of the filter cloth [168] abuts a sealing surface [185] of the adapter ring [170].

2. A filter plate assembly [1] according to claim 1, wherein the flange [172] of the adapter ring [170] further comprises a clearance hole [176], the shelf portion [108] of the filter plate [100] comprises a bore [106], and at least one fastener [174] passes through the clearance hole [176] and into the bore [106], thereby securing the adapter ring [170] to the filter plate [100].

3. A filter plate assembly [1] according to claim 2, wherein the bore [106] is a threaded bore, and the at least one fastener [174] is an externally-threaded fastener which threadedly engages said bore [106].

4. A filter plate assembly [1] according to claim 2, wherein said bore [106] is a clearance bore, and the at least one fastener [174] is an internally-threaded barrel bolt fastener which fits within the bore [106] and is configured to receive an externally threaded fastener.

5. A filter plate assembly [1] according to claim 2, wherein said bore [106] is a clearance bore, and the at least one fastener [174] is an externally-threaded fastener which fits within an internally-threaded fastener.

6. A filter plate assembly [1] according to claim 1, wherein the sealing surface [185] of the collar [167] comprises at least one annular rib [171] or groove defining a serpentine profile.

7. A filter plate assembly [1] according to claim 1, wherein the adapter ring [170] further comprises a backer plate ring [175].

8. A filter plate assembly [1] according to claim 1, wherein the grommet [168A] comprises a plurality of bosses [165] each having an abutment surface [165A].

9. A filter plate assembly [1] according to claim 8, wherein each boss [165] comprises tapered sidewalls [169].

10. A filter plate assembly [1] according to claim 8, wherein valleys [161] are interposed between the bosses [165] in an alternating arrangement.

11. A filter plate assembly [1] according to claim 10, wherein at least one of the valleys [161] are oriented towards a bottommost portion of the feed eye assembly [140] such that it extends towards a bottom portion [132] of the filter plate [100].

12. A filter plate assembly [1] according to claim 1, wherein an internal portion of the adapter ring [170] comprises an internal seal surface [178] and an external portion of the grommet [168A] comprises a complimentary external seal surface [162].

13. A filter plate assembly [1] according to claim 1, wherein two adapter rings [170] and two filter cloth assemblies [160] are provided on opposing sides of the filter plate [100].

14. A filter plate assembly [1] according to claim 1, wherein a durometer of the adapter ring [170] is lower than a durometer of the grommet [168A].

15. A filter plate assembly [1] according to claim 1, wherein the recess [102] comprises a tapered surface [103] and the flange [172] comprises a complimentary-shaped tapered surface [184].

16. A filter plate assembly [1] according to claim 1, wherein a ring [164] extends from the collar [167], the ring [164] being positioned within said barrel [179] such that an outer wall [166] of the ring [164] is in close proximity with an inner wall [180] of the barrel [179].

17. A filter plate assembly [1] according to claim 16, wherein said close proximity between the outer wall [166] and inner wall [180] may be an interference fit, a press fit, a snug fit, a zero tolerance fit, a snap or other connection, a taper lock fit, or a loose fit.

* * * * *